Patented Jan. 26, 1954

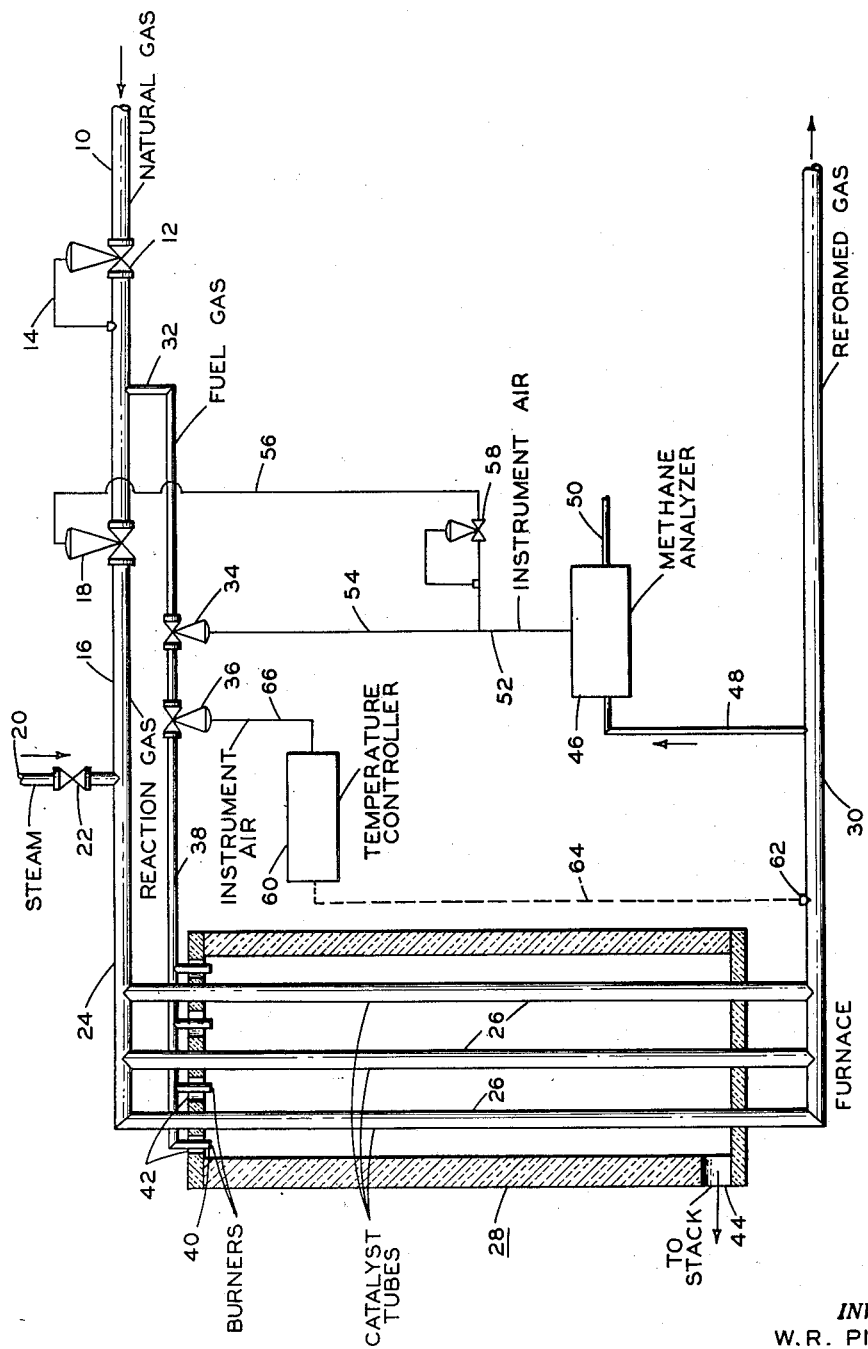

2,667,410

UNITED STATES PATENT OFFICE 2,667,410

APPARATUS FOR REFORMING HYDROCARBONS

Weller R. Pierce, Dumas, Tex., assignor to Phillips Petroleum Company, a corporation of Delaware Application January 4, 1950, Serial No. 136,742

5 Claims. (Cl. 48—196)

This invention relates to improved method and apparatus for use in reforming hydrocarbon gases to produce gases containing hydrogen and carbon monoxide. In some of its preferred aspects it pertains to a control method whereby when natural gas or other methane-containing gas is reformed by reaction with steam in the presence of a catalyst in externally fired catalyst tubes the methane content of the resulting reformed gas is always maintained at a low value. In other specific and preferred aspects the invention pertains to particular control apparatus adapted for obtaining completely automatic control of a process of the type described. Among the important advantages of the invention is the fact that its use permits maximum production of synthesis gas (reformed gas) for a given apparatus and catalyst.

Gases containing hydrogen and carbon monoxide find several uses. For example, such a gas can be used as such for the catalytic synthesis of hydrocarbons by reaction of the hydrogen with the carbon monoxide in the presence of iron or cobalt catalyst; varying amounts of oxygenated hydrocarbon compounds can also be formed in such a synthesis. A gas containing hydrogen and carbon monoxide can be treated catalytically with excess steam to convert a large proportion of the carbon monoxide to carbon dioxide. This carbon dioxide can then be removed by known means, thus producing a gas high in hydrogen content. Such a gas containing large amounts of hydrogen can be used for fuel or industrial purposes, or by further supply of nitrogen thereto or to the original gas from which the hydrogen gas is produced, a gas mixture suitable for the catalytic synthesis of ammonia is obtained.

One such instance involves the reaction of natural gas with an excess of steam over a nickel or nickel oxide catalyst commonly referred to as a reduced nickel oxide catalyst disposed in a plurality of vertical catalyst tubes which are placed within a furnace. This furnace is fired by combustion of natural gas and the hot combustion products supply heat to the outside of the catalyst tubes. The resulting reformed gas is obtained with as low methane content as possible, since a large proportion of the residual methane ultimately appears in the process cycle gas in the ammonia synthesis step to be described. The reformed gas is next admixed with external air in a quantity sufficient to provide the desired amount of nitrogen for reaction with hydrogen to form ammonia, and the mixture passed through a secondary reformer wherein the oxygen content of the air destroyed by reaction with hydrogen and with residual methane, thus introducing nitrogen to the system and at the same time reducing to some extent but not entirely the residual methane in the reformed gas. The resulting gas is passed through a "shift converter" wherein it contacts a catalyst at conditions such that the water gas shift reaction occurs whereby carbon monoxide and steam react to form carbon dioxide and hydrogen. Carbon dioxide is scrubbed from the resulting gas by use of an amine solution or other known means, residual carbon monoxide is removed as by scrubbing with a cuprous salt solution, and the resulting ammonia synthesis gas composed essentially of 3 parts of hydrogen to one part of nitrogen and also containing small amounts, for example 10 per cent, of gases inert in the ammonia synthesis reaction including methane, argon, helium and other rare gases is compressed and reacted in the presence of a metallic synthesis catalyst in known manner to produce ammonia. Ammonia is removed from the effluent, and a large portion of the residual gas is recycled to the ammonia synthesis reactor. Because the methane and rare gases become concentrated in the cycle gas, a portion thereof must be purged continuously or intermittently to avoid too high a build-up in the ammonia synthesis system.

By way of example, in the reforming process in an ammonia plant, natural gas treated for the removal of hydrogen sulfide and organic sulphur and heated to a temperature within the range of 400 to 440° C. is admixed with at least 100 per cent excess steam super-heated to a temperature of about 400° C. and passed over a reduced nickel oxide catalyst contained in a plurality of vertically disposed 25/20 stainless steel tubes. The steam to natural gas ratio is about 11.3:1 or greater, and the steam to reformed gas ratio is about 1.47:1 or greater (expressed as lbs. of steam per hour per cubic feet per minute of reaction gas). The gas volume ratio of steam to reformed gas in the total effluent, from the primary references is maintained at at least 0.5:1, and preferably at 0.6:1. The catalyst-containing tubes are stationed in a down-fired furnace wherein a reformed gas effluent temperature in the range 700 to 750° C. is maintained. The preferred temperature will depend on various factors including activity of catalyst and space velocites and in some instances can be higher than 750° C. In a typical plant from 10 to 12 vertical reaction tubes are disposed in a single furnace cell. Several of these cells are used, each cell being fed an individually controlled mixture of natural gas and steam, and each cell being fired individually. A single plant may comprise one, two, or more units of six cells each. It is very important that as much as possible of the hydrocarbon content of the natural gas be converted to carbon oxides and hydrogen. Any methane contained in the reformed gas is deleterious to the subsequent ammonia synthesis step wherein the methane will build up in the synthesis gas cycle around the converters and thus increase the amount of gas which must be purged from the cycle. It has been estimated that an increase of 1 per cent in the methane content of the reformed gas will result in a decrease of about 6 per cent in ammonia production. Therefore, the methane content of the reformed gas should never exceed about 5 per cent and should preferably be below 2.5 per cent, or even 1 per cent or less. At the higher values within these ranges an active catalyst for example reduced nickel oxide should be used in the secondary reformers to decrease the methane content of the final synthesis gas.

It is an object of this invention to provide an improved means of control for a reforming process wherein a hydrocarbon gas is converted by reaction with steam to hydrogen and carbon monoxide.

Another object of the invention is to provide improved control apparatus for controlling such a process.

Another object is to provide a novel method of control whereby the maximum permissible methane content of the reformed gas is never exceeded and yet the greatest possible throughput is at all times maintained in the reforming system.

A further object of the invention is to provide specific control mechanisms particularly adapted to insure adequate reaction of natural gas or other hydrocarbon gas being reformed catalytically in the presence of steam in externally fired catalyst tubes and yet avoid undesirably high temperatures.

Further objects and advantages of the invention will be apparent, to one skilled in the art, from the accompanying disclosure and discussion.

While the invention will be described with particular reference to the reforming of natural gas, it will be clear to those skilled in the art that other hydrocarbon materials, broadly termed herein hydrocarbon gases but which may be normally gaseous or normally liquid as desired although gaseous while undergoing reforming reaction, may be employed if economically warranted in a particular situation. Natural gas is by far the most common hydrocarbon feed to the reforming process.

The present invention provides a control system whereby it is possible to pass the maximum amount of natural gas to a given reforming furnace without exceeding a predetermined methane content in the effluent reformed gas and without exceeding a predetermined maximum temperature in the furnace. In a specific embodiment of this invention, a methane analyzer, for example an infra-red spectrophotometer, continuously determines and records the methane content of the reformed gas effluent and continuously adjusts the rate of fuel input to the reforming furnace so as to maintain the desired methane content in the effluent reformed gas. When the above procedure has raised the temperature of the effluent from the furnace to a predetermined level as determined by a thermocouple, said thermocouple takes over the control of the flow of fuel gas so as to prevent further increase thereof with resultant overheating of the catalyst. Thus in effect the temperature controller activated by the thermocouple overrides the control of the fuel normally maintained by the methane analyzer. Under these circumstances, the methane analyzer then proceeds to reduce the rate of natural gas flow to the catalyst tubes so as to continue to maintain a given predetermined maximum methane content in the effluent gas from the furnace which is now operating at maximum temperature.

It will be appreciated by those skilled in the art that given materials of construction, given catalyst, and given reactants all may affect the maximum desirable temperature in a high temperature operation of the type described. Thus the limiting factor may be the catalyst tubes, it may be the heat resistance of the catalyst, or it may be the heat resistance of the refractories from which the furnace is made or with which it is lined. Reaction rates and thermodynamic considerations may also play a part in choice of a desired maximum temperature. In the present invention, it is preferred to detect the temperature of the reformed gas just as it leaves the catalyst tubes or immediately after exit from the furnace proper. However, temperature detection can be obtained at various other points in the system wherein the temperature is directly related to the temperature of the effluent reformed gas. Thus the temperature at one or more points within the furnace itself, or the temperature within a catalyst tube itself, or the external temperature of catalyst tubes may all be employed as controlled points as desired. Obviously for a desired maximum temperature of effluent reformed gas of say 750° C., if the control point is within the furnace proper it will be considerably higher. It will also be clear to those skilled in the art, once having been given the present disclosure, that various types of thermocouples, recorders, controllers, methane analyzers, and similar instruments as required can be employed without departing from the broad scope of the invention. Valves in fuel gas lines and in the hydrocarbon feed gas lines may be any conventional type of motor valve, operated either in response to the varying pressure of air in an instrument air line by known means, or operated electrically by known means, as determined by the controlling instruments employed. Inasmuch as such motor valves, thermocouples, methane analyzers, control instruments responsive to temperature for varying the setting of a valve, and control instruments responsive to methane content for varying the setting of a valve, are all well known to the art in their individual forms, construction of same will not be described in great detail herein as it would only serve to burden the description of the invention without adding to the clarity thereof. While natural gas is described as the preferred fuel to the furnaces, other liquid or even solid fuels can be employed in known manner, their rate of passage to the furnace for combustion being suitably controlled in a manner which will be obvious to those skilled in the art.

A preferred embodiment of the present invention is shown in the accompanying drawing, which is a schematic diagram of apparatus elements and flow of materials therethrough together with the essential control instruments, suitable for practicing the invention. The drawing and the description thereof will serve to exemplify the invention. Various modifications of the specific arrangement and elements can be made by those skilled in the art without departing from the invention.

In the drawing, natural gas from any suitable source is introduced through line 10 and its pressure reduced to a fixed value, for example 80 pounds per square inch gauge, by means of a standard pressure reducing valve 12 made responsive to the downstream pressure by control line 14. This natural gas is the source both of the fuel gas and the reaction gas which is to be reformed. Reaction gas is passed via lines 16 and 24 to the catalyst tubes 26, the flow of gas through line 16 being controlled by a conventional motor valve 18 of any desired design. Steam is introduced into the reaction from line 20 at a rate fixed by valve 22. This rate is chosen so as always to be in excess of the quantity stoichiometrically required for the reforming of the maximum quantity of reaction gas which can be passed through the system. The mixture of steam and natural gas is passed via manifold 24 into a group of catalyst tubes shown diagrammatically by the three vertically positioned catalyst tubes 26 in the drawing. These are placed in a furnace 28 made of or lined with suitable fire resistant refractories. Means (not shown) are of course provided for introducing catalyst into the catalyst tubes and for dumping the catalyst therefrom when it has become unsuitable for further use. Reformed gas, composed largely of hydrogen, carbon monoxide, carbon dioxide, and steam, together with residual unreacted hydrocarbons, largely methane, are withdrawn from the catalyst tubes through line 30 and passed to further treatment as described hereinabove.

The fuel gas is withdrawn from line 10 via line 32, and passes through motor valve 34 and motor valve 36 to line 38 and then to the burners 40. These burners are of any conventional type and are shown disposed in the top of the furnace in air openings 42 adapted to supply the necessary air for combustion. The hot combustion gases leave the furnace at the bottom through opening 44 and pass to the stack in conventional manner, first going through waste heat boilers for production of steam if desired.

By way of example, a typical natural gas fed to the process as reaction gas and as fuel gas is as follows:

| | |
|---|---:|
| $CO_2$ | 0.12 |
| $N_2$ (including rare gases) | 16.67 |
| $CH_4$ | 71.56 |
| $C_2$ | 5.73 |
| $C_3$ | 3.55 |
| $C_4$ | 1.69 |
| $C_5$ | 0.45 |
| $C_{6+}$ | 0.23 |
| Total | 100.00 |

By way of example, a typical reformed gas effluent, which leaves the catalyst at 700 to 750° C., is as follows. This gas contains more methane than is desired; as is indicated hereinabove the reforming process should be so controlled to maintain this methane content below 2.5 per cent and preferably not greater than 1 per cent. The reformed gas contains 0.6 volume steam per volume of other constituents, but the following analysis is given on the dry basis:

| | |
|---|---:|
| $CO_2$ | 12.9 |
| CO | 7.0 |
| $H_2$ | 71.5 |
| $CH_4$ | 3.3 |
| $N_2$ | 5.3 |
| Total | 100.0 |

As indicated hereinbefore, it is preferred that a considerable excess of steam be used, because excess steam does no harm other than reduce the capacity slightly, whereas insufficient steam permits a rapid increase in the methane content of the reformed gas and also is very deleterious to the catalyst. A steam rate of at least 12 lbs. of steam per hour per cubic foot per minute of reaction gas is suitable, the reaction gas being taken as the maximum which can pass through the flow valves in their wide-open position.

Turning again to the drawing, a methane analyzer 46 is shown diagrammatically. This methane analyzer may take any suitable form, and its operation might for example be based on thermal conductivity measurements, combustion of residual methane (although this is less suitable because of the low methane content), or infrared spectrophotometric analysis. The latter is preferred, and in such case a small stream of the effluent gas to be analyzed for methane is continuously lead from exit line 30 via line 48 at a fixed rate controlled in known manner and passed through a cell in the methane analyzer 46 through which is passed a beam of infra-red radiation. The gas thus used is then passed to the atmosphere through line 50 or if desired returned to admixture with the balance of reformed gas. The proportion passing through the cell of infra-red light of the wave length which is absorbed by methane is measured photometrically and the methane content thus constantly determined. In a large plant in which several cells of catalyst tubes are used and are thus to be controlled individually, a single methane analyzer of the type described can be used, with gas from each cell being sampled in turn and the results transmitted to the respective control systems on a time cycle basis through the use of known time cycle devices. The methane analyzer is calibrated so that for the range of methane contents anticipated a suitable corresponding range of air pressures can be supplied in the instrument air line leading from the methane analyzer to the control instruments. Instrument air is supplied to the methane analyzer at a constant pressure, for example 30 p. s. i. g., and this pressure is reduced in known manner, for example by a conventional variable reducing valve, as required. The analyzer 46 thus causes the air pressure in instrument air line 52 leading from it to the control instruments to vary as a function of the methane content of the reformed gas in conduit 30. The instrument air line 52 leads by way of line 54 directly to motor valve 34, and by way of line 56 to motor valve 18. In line 56 is placed a pressure controller 58 which is responsive to the air pressure in line 52 and is pre-set to become operative for pressuring control air into line 56 whenever the control air pressure in line 52 reaches a predetermined maximum value which is the value at which motor valve 34 is completely open or at least largely open.

Temperature controller 60 is indicated in the drawing diagrammatically, and it may be of any conventional type. It operates in response to a thermocouple 62 which is shown detecting the temperature of the effluent reformed gas in line 30 shortly after leaving the furnace. However as indicated above, the temperature control point at which thermocouple 62 is placed may be elsewhere in the system as desired. The temperature thermocouple 62 is connected by electrical or other means 64 to temperature controller 60, and the latter is adapted by known means to supply instrument air of varying pressure, proportional to the detected temperature, to instrument air line 66 leading to motor valve 36. Many suitable temperature controllers are known which are suitable for use as temperature controller 60. Motor valve 36 is set with the control air on the side of the diaphragm which will cause the motor valve to close with increased pressure and open with decreased pressure. Motor valve 18 in the reaction gas line 16 is also so set, whereas motor valve 34 in fuel gas line 32 is oppositely set so that increased air pressure in instrument control line 34 opens valve 34 and decreased control pressure closes it.

While the operation of the controls will be described with reference to what happens as the methane content of the reformed gas tends to increase and the controls take steps to prevent the increase above the predetermined set point, it will be clear to those skilled in the art that as the opposite happens, i. e. as the methane content of the reformed gas tends to decrease, the controls operate in opposite sequence in order to decrease the severity of reforming and thus maintain the methane content of the reformed gases in a chosen narrow range. The controls permit at all times the maximum possible quantity of reaction gas to be passed through line 16 into the catalyst tubes so as to obtain the maximum throughput for the system, limited only by the methane content of the reformed gas and the maximum temperature which the system will withstand, about 750° C. as indicated hereinabove.

In operation, as the methane content in the reformed gas in line 30 begins to increase towards or past the predetermined value, for example 2.5 per cent, this is detected by methane analyzer 46 which in turn increases the air pressure in air control lines 52 and 54 which, acting on the diaphragm of motor valve 34, cause same to open to a greater extent than it had been open. This permits a greater flow of fuel gas to the furnace, thus increasing the heat liberated in the furnace and thus increasing the severity of the reforming reaction. This will tend to reduce the methane content of the effluent. Should the methane content continue to rise, motor valve 34 is further opened to provide additional fuel gas. The increased fuel gas, by increasing the heat input to the catalyst tubes, decreases the methane content of the effluent gas. As this decreases, the motor valve 34 of course acts in the opposite direction cutting back the fuel gas somewhat. However, when conditions, for example catalyst activity, are such that the increased heat input fails to reduce the methane content sufficiently, the furnace temperature increases since the heat is not being taken up by the endothermic reforming reaction. So long as the temperature control point does not exceed the pre-set value, representing a chosen value between 700 and 750° C. for the reformed gas outlet temperature, temperature controller 60 is inoperative. However when the temperature control point reaches the maximum temperature, temperature controller 60 takes over and as soon as the temperature increases above the pre-set value provides an increased control air pressure in line 66 which acts on the diaphragm of motor valve 36 and throttles same to reduce the quantity of fuel gas entering the furnace. This will happen only when motor valve 34 in the fuel gas line has reached its maximum open position, which may be wide open or which may be arbitrarily chosen ahead of time to be say three-fourths or seven-eighths open. The partial closing of motor valve 36 effected by temperature controller 60 will reduce the amount of fuel gas passed into the furnace and thus prevent the temperature of the furnace from going above the predetermined maximum. But under the conditions assumed, decreased heat input to the catalyst tubes, made necessary by the furnace being at its maximum temperature, permits the methane content of the effluent reformed gas in line 30 to continue to increase. As this occurs, the air control pressure in lines 52 and 54 continues to increase but motor valve 34 is already at its maximum opening, whereupon pressure control valve 58 takes over, having been pre-set to become operative under such conditions. Valve 58 permits the increased air pressure to enter control line 56 which connects the control air with the diaphragm of motor valve 18 in the reaction gas inlet. Valve 18 then begins to close responsive to the increased pressure in control line 56. This throttling of valve 18 and hence reducing the amount of natural gas fed to the catalyst tubes continues so long as the methane content of the effluent reformed gas tends to increase above the predetermined maximum value. It will be apparent that this operation will bring the reaction to the desired state of conversion when the supply of fuel gas has been increased as much as possible by motor valve 34 but this has been overridden by motor valve 36 in order to avoid undesirably high furnace temperature.

While motor valve 36 responsive to temperature has been shown as a valve separate from valve 34 responsive to methane content, both being in the fuel gas line, valve 36 may if desired be dispensed with and motor valve 34 chosen as a "three-way" or "over-control" valve of known type. Such a valve is arranged to operate in the manner described with respect to the two valves 34 and 36, so that when the valve is opened as far as determined in advance to be desirable by air pressure from instrument control line 54, this action will be over-ridden by increased pressure of control air in line 66 which in this instance would be also connected to valve 34 in known manner. While air control of the motor valves has been described, those skilled in the art will appreciate that analogous electrical controls may be employed wherein the motor valves are operated by solenoids or otherwise in response to varying voltage or current in electrical control lines which are connected with methane analyzer 46 and temperature controller 60. In this instance pressure control valve 58 in control line 56, sometimes known as an air relay, is replaced with a suitable electrical relay for accomplishing the same results.

While the invention has been described with reference to specific preferred embodiments, other variations of arrangement and apparatus details can be made without departing from the spirit and scope of the invention as defined in the accompanying claims.

I claim:

1. Apparatus for controlling the operation of a system for reforming a hydrocarbon gas by reaction with steam to produce a reformed gas containing hydrogen and carbon monoxide, said system including a furnace containing a plurality of externally fired catalyst tubes, fuel supply means for introducing fuel to the furnace, a conduit for supplying steam to the catalyst tubes, a conduit for supplying hydrocarbon gas to be reformed to said catalyst tubes, and a conduit for withdrawing reformed gas from said catalyst tubes, said apparatus comprising at least one control means on said fuel supply means for controlling the quantity of fuel supplied to the furnace, a control valve on the conduit supplying hydrocarbon gas to be reformed to the catalyst tubes, a hydrocarbon gas measuring device for determining the quantity of unreacted hydrocarbon gas present in the aforesaid reformed gas conduit, a temperature measuring device for measuring a temperature within the system which is directly related to the reaction temperature, a controller adapted to control said fuel supply responsive to the measured hydrocarbon content of the reformed gas whereby the fuel supply is increased as the said hydrocarbon content increases, a controller responsive to the aforesaid measured temperature adapted to override the last mentioned fuel supply controller sufficient to avoid an increase in temperature above a predetermined maximum value by throttling the supply of fuel, and a supplemental controller operative to throttle the aforesaid valve on the conduit supplying hydrocarbon gas to the catalyst tubes responsive to the measured hydrocarbon content of the reformed gas whenever same tends to increase above a predetermined maximum value and the fuel supply controller which is responsive to the hydrocarbon gas content of the reformed gas is being overridden by the said temperature controller.

2. Apparatus according to claim 1 wherein said controller responsive to said measured temperature is responsive to a temperature measuring device mounted upon said conduit withdrawing reformed gas from said catalyst tubes and is adapted to measure the temperature within said conduit.

3. Apparatus according to claim 1 wherein the means for supplying fuel is a conduit carrying a fuel gas, said fuel supply controller is a valve in said conduit, and said overriding controller is a separate valve in said conduit.

4. Apparatus according to claim 1 wherein the means for supplying fuel is a conduit carrying a fuel gas, said fuel supply controller is a valve in said conduit, and said overriding temperature control is operated to throttle said last named valve.

5. Apparatus according to claim 1 wherein the means for supplying fuel is a conduit carrying a fuel gas, said fuel supply controller comprises an air-operated motor valve in said conduit, the control valve in the line supplying hydrocarbon gas to the catalyst tubes is an air-operated motor valve, and wherein said apparatus comprises a single control air conduit connecting the hydrocarbon gas analyzer with the last two named motor valves said analyzer being adapted to increase the pressure in said control air conduit in response to an increase in measured hydrocarbon content and decrease said pressure in response to a decrease in measured hydrocarbon content, the first said motor valve in the fuel supply line is adapted to open proportional to increased air pressure in said control conduit and a pressure responsive valve interposed in the control conduit leading to the motor valve in the reaction gas supply line pre-set so as to open and thereby supply pressure control air to the last named valve to throttle same whenever the pressure of control air from said hydrocarbon analyzer increases to a value in excess of that which will cause further opening of the fuel supply motor valve.

WELLER R. PIERCE.

References Cited in the file of this patent

UNITED STATES PATENTS

| Number | Name | Date |
|---|---|---|
| 1,904,592 | Young et al. | Apr. 18, 1933 |
| 1,904,593 | Young et al. | Apr. 18, 1933 |
| 2,171,596 | Parker | Sept. 5, 1939 |
| 2,172,106 | Parker | Sept. 5, 1939 |
| 2,173,984 | Shapleigh | Sept. 26, 1939 |
| 2,258,146 | Pontow | Oct. 7, 1941 |
| 2,262,427 | Liedholm | Nov. 11, 1941 |
| 2,430,432 | Marisic | Nov. 4, 1947 |
| 2,463,115 | Legatski | Mar. 1, 1949 |
| 2,565,395 | Scharmann | Aug. 21, 1951 |